(12) United States Patent
Thurman

(10) Patent No.: US 7,699,614 B2
(45) Date of Patent: Apr. 20, 2010

(54) BEHAVIOR SHAPING KIT

(76) Inventor: Kristen L. Thurman, 1306 John Sharp Rd., Spring Hill, TN (US) 37174

( * ) Notice: Subject to any disclaimer, the term of this patent is extended or adjusted under 35 U.S.C. 154(b) by 0 days.

(21) Appl. No.: 10/236,902

(22) Filed: Sep. 9, 2002

(65) Prior Publication Data
US 2004/0048229 A1 Mar. 11, 2004

(51) Int. Cl.
*G09B 19/00* (2006.01)
(52) U.S. Cl. .................. 434/237; 434/247; 434/433
(58) Field of Classification Search ......... 434/236–238, 434/258, 247, 433, 308, 309; 206/223, 575, 206/576, 579; 446/75, 73
See application file for complete search history.

(56) References Cited

U.S. PATENT DOCUMENTS

| | | | | |
|---|---|---|---|---|
| 684,107 A | * | 10/1901 | Rueger | 40/107 |
| 1,712,198 A | * | 5/1929 | Clapp | 297/473 |
| 2,414,614 A | | 1/1947 | Shurick | |
| 2,650,590 A | * | 9/1953 | Moore et al. | 128/882 |
| 2,761,683 A | * | 9/1956 | Stancliff | 472/19 |
| 2,965,978 A | * | 12/1960 | Olson | 434/238 |
| 3,654,645 A | * | 4/1972 | Lee | 5/99.1 |
| 4,033,622 A | * | 7/1977 | Boudreau | 297/256.13 |
| 4,306,869 A | * | 12/1981 | Oettinger et al. | 434/305 |
| 4,560,359 A | * | 12/1985 | Wilson et al. | 446/75 |
| 4,741,701 A | | 5/1988 | Kossor | |
| 4,777,751 A | * | 10/1988 | Pasquale | 40/612 |
| 4,861,305 A | * | 8/1989 | Wilson | 446/75 |
| 4,935,976 A | * | 6/1990 | 'Milman | 5/93.1 |
| 5,050,740 A | * | 9/1991 | Lucero | 206/579 |
| 5,114,344 A | * | 5/1992 | Fumagalli et al. | 434/128 |
| 5,123,846 A | * | 6/1992 | Lewis | 434/130 |
| 5,156,409 A | * | 10/1992 | Barnes | 273/444 |
| 5,356,355 A | * | 10/1994 | Campbell | 482/43 |
| 5,387,107 A | | 2/1995 | Gunter | |
| 5,470,235 A | | 11/1995 | Papaleo | |
| 5,522,508 A | * | 6/1996 | Pesola | 206/579 |
| 5,573,404 A | | 11/1996 | Stawski | |
| 5,573,405 A | * | 11/1996 | Evans | 434/238 |
| 5,634,796 A | * | 6/1997 | Dollar | 434/236 |
| 5,683,137 A | * | 11/1997 | McDonald et al. | 297/217.3 |

(Continued)

FOREIGN PATENT DOCUMENTS

JP 2000024169 1/2000

OTHER PUBLICATIONS www.chp.edu, Mr Yuk stickers.*

(Continued)

*Primary Examiner*—Bena Miller
(74) *Attorney, Agent, or Firm*—Wayne Edward Ramage; Baker Donelson

(57) ABSTRACT

A behavior shaping kit includes at least one time-out defining device, at least one timer, a plurality of stickers having prohibitory indicia marked thereon, training devices for a caregiver, a plurality of stop signs, and craft tools. The caregiver affixes stickers having prohibitory indicia marked thereon, to items in the house with which the child should not come into contact. When a child does come into contact with these items, the child is immediately placed in a time-out area which is defined by a time-out defining device. A time-out defining device serves to restrict movement of the child from place to place.

13 Claims, 2 Drawing Sheets

U.S. PATENT DOCUMENTS

| | | |
|---|---|---|
| 5,697,790 A | 12/1997 | Garland |
| 5,725,382 A | 3/1998 | Walter |
| 5,836,021 A * | 11/1998 | Davidson et al. ................ 4/411 |
| 5,938,281 A * | 8/1999 | Keils ........................ 297/217.1 |
| 5,954,512 A | 9/1999 | Fruge |
| 6,250,929 B1 | 6/2001 | Kolb |
| 6,345,864 B1 * | 2/2002 | Rivera et al. ................ 297/130 |
| 6,522,263 B2 * | 2/2003 | Jones .......................... 340/915 |

OTHER PUBLICATIONS

"The 7 Habits of Highly Effective Families" by Stephen R. Covey, published 1997.*
www.yahoo.com (dictionary).*
www.colonialmedical.com: Banner Door Alarm.*
www.web.archive.org: for www.colonialmedical.com.*
www.proquest.umi.com 1991 article by Cindy Crizaldo.*

* cited by examiner

BEHAVIOR SHAPING KIT

BACKGROUND OF THE INVENTION

1. Field of the Invention

The present invention relates to a behavior shaping kit and method, and particularly to a behavior shaping kit and method suitable for a caregiver to utilize when teaching discipline to children of any age.

2. Description of the Related Art

In disciplining young children, it is generally necessary to communicate as clearly as possible to a child what kinds of behavior are deemed to be acceptable as well as unacceptable. Properly defining behavior and responding quickly are important in communicating to a child the caregiver's expectations. For example, once a child is given warning that a certain behavior is unacceptable, providing feedback in response to the unacceptable behavior reaffirms the inappropriateness of the child's action. It is considered desirable that feedback be provided as quickly as possible following the display of a behavior, so that the child will be able quickly and clearly to associate the feedback with the behavior for which it was given. It is also considered desirable to provide ongoing feedback, so that a child can know with certainty that a given behavior will result in a particular, specific, and consistent response.

Traditional forms of discipline utilized by caregivers, such as parents, babysitters, or guardians, often include spanking and yelling. These forms of discipline, while relaying to the child that the misbehavior is unacceptable, tend to have many negative side effects. Spanking and yelling generally cause the child to fear the caregiver. This type of discipline also demoralizes the child, promotes poor self-esteem, and leaves the child feeling powerless. The caregiver also sets a poor example for a child by teaching the child that yelling at another or hitting another when angry or frustrated is acceptable behavior.

Other methods of disciplining children which do not immediately punish misbehavior make it more difficult for the child to associate a negative result with a given misbehavior. For example, ignoring misbehavior while rewarding good behavior seems to relay that misbehavior is tolerable, rather than unacceptable. Thus, a discipline system which quickly and clearly communicates that reward/punishment is directly linked to a given behavior is desirable.

U.S. Pat. No. 5,697,790, issued Dec. 16, 1997 to A. Garland, discloses a method for a caregiver to teach discipline to a child which involves the caregiver selecting a plurality of tokens in response to misbehavior of the child and instructing the child of a suitable token phrase relating to the misbehavior. The child places at least one of the tokens into a first portable container and repeats the token phrase. The child repeats the act of placing the tokens and repeating the token phrase a plurality of times.

Other patents relating to behavior monitoring and modification include U.S. Pat. No. 2,414,614, issued Jan. 11, 1945 to E. Shurick (device carrying names of children and a corresponding daily actuatable indicator so child may keep a record of conduct during the course of a week, the arrangement being such that if child is deserving, the device will discharge a prize); U.S. Pat. No. 4,741,701, issued May 3, 1988 to S. Kossor (behavior monitoring and status reporting device has indicator to show the current status of the child's behavior as the child completes each of a series of objectives); U.S. Pat. No. 5,387,107, issued Feb. 7, 1995 to L. Gunter (story book for teaching desired behavioral patterns); U.S. Pat. No. 5,470,235, issued Nov. 28, 1995 to S. Papaleo (child behavior improvement system utilizes support member with plurality of receptacles for receiving indicia of reward); U.S. Pat. No. 5,573,404, issued Nov. 12, 1996 to W. Stawski (behavior modification device comprising implement depicting various activities separated into columns, with assigned monetary value); U.S. Pat. No. 5,573,405, issued Nov. 12, 1996 to S. Evans (behavior training and modification device includes board having plurality of pegs and indicator plates); U.S. Pat. No. 5,954,512, issued Apr. 17, 1998 to D. Fruge (behavior tracking board for monitoring behavior for a certain period and determining rewards and punishment accordingly); Japanese Patent No. 2000024169 (intellectual training game for infants); U.S. Pat. No. 5,725,382 issued Mar. 10, 1998 to J. Walter (self-contained, interactive toilet training kit for children and caregivers); U.S. Pat. No. 6,250,929 B1 (methods for improving effectiveness of toilet training.

None of the above inventions and patents, taken either singly or in combination, is seen to describe the instant invention as claimed. Thus, a behavior shaping kit solving the aforementioned problems is desired.

SUMMARY OF THE INVENTION

The present invention provides a behavior shaping kit and process for a caregiver to teach discipline to a child while minimizing the tendency for miscommunication, and which prevents tension between caregiver and child. In one form of the invention, the kit includes at least one time-out defining device, at least one timer, a plurality of stickers having prohibitory indicia marked thereon, training devices for a caregiver, a plurality of stop signs, and craft tools. The caregiver affixes stickers having prohibitory indicia marked thereon to items in the house with which the child should not come into contact. When a child does come into contact with these items, the child is immediately placed in a time-out area which is defined by a time-out defining device. A time-out defining device serves to create a time-out area.

In another form of the invention, the kit additionally comprises a contractual instrument which establishes activities and goals agreed upon by the child and the caregiver and consequences for performing or failing to perform a particular activity or achieving a particular goal. The caregiver and the child will utilize the craft tools to create symbols to represent goals and activities agreed upon by both the caregiver and the child, and affix these symbols to various objects in the house as helpful reminders. When a child misbehaves, the child may be placed in a time-out area or elect to suffer one of the consequences agreed upon in the contractual instrument.

Accordingly, it is a principal object of the invention to shape the behavior of a child in a non-threatening manner.

It is another object of the invention to help a caregiver to effectively relay to a child what types of behavior are considered acceptable as well as unacceptable.

It is a further object of the invention to allow a child an opportunity to quietly reflect on misbehavior and appropriate alternatives while being disciplined.

Still another object of the invention is to discipline a child without damaging the child's self-esteem.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
FIG. 1 is a top perspective view of a behavior shaping kit according to the present invention.

The present invention relates to a behavior shaping kit, designated generally as 10 and a process for a caregiver to shape the behavior of a child. As shown in FIG. 1, the kit 10 includes at least one time-out defining device, at least one timer, a communication facilitator, a stop sign 18, a plurality of craft tools 19, and a plurality of training devices 20 for a caregiver. The kit 10 may include container 22 for carrying kit 10 and may be, for example, a plastic case. While the kit 10 and the process for a caregiver to shape the behavior of a child is described herein as applied to a household setting, the kit 10 and process may be modified to apply to various other settings such as school, daycare, and business settings.

Figure 2:
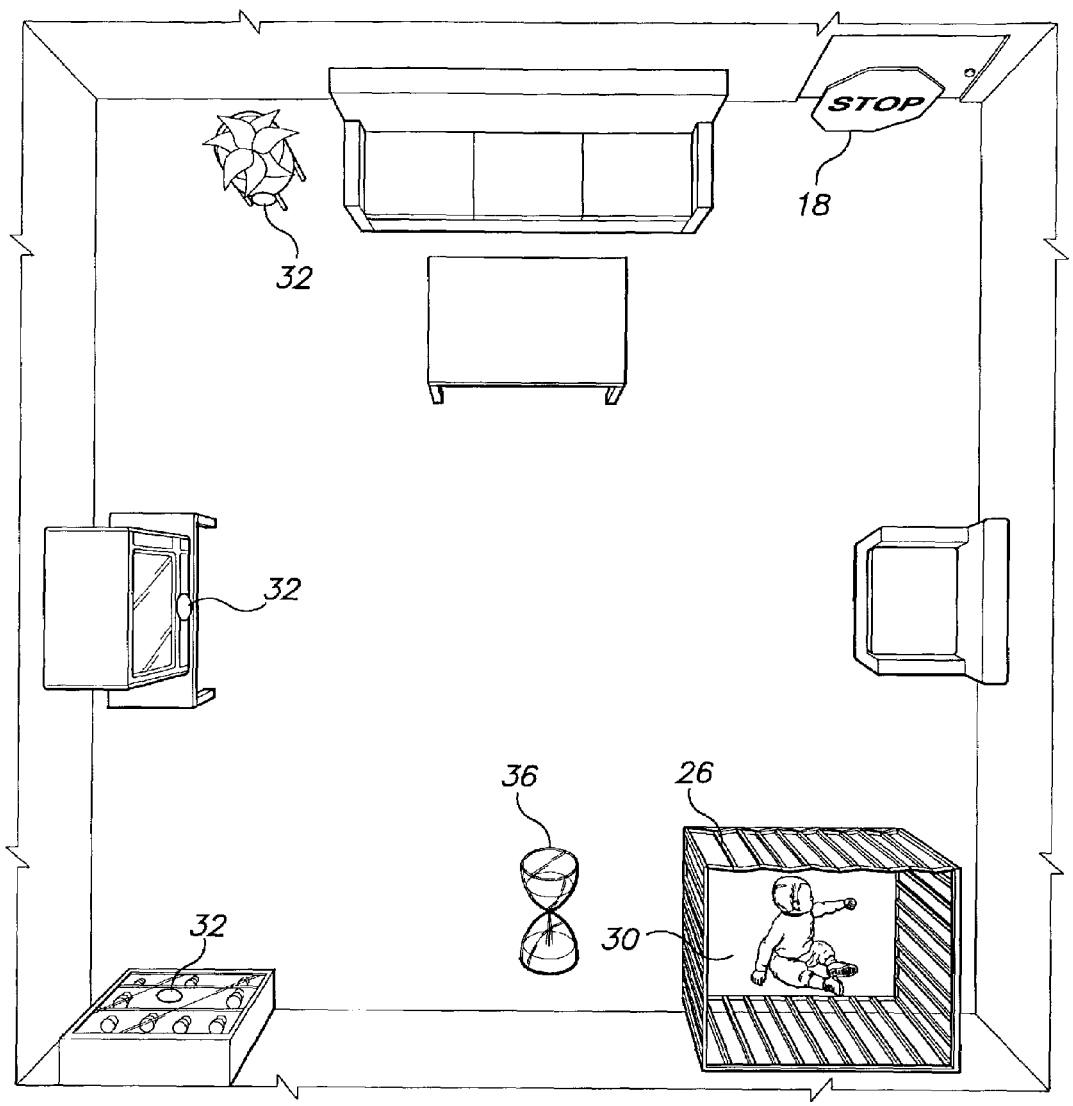
FIG. 2 is a plan view of a room in which a child is confined in a time-out area.

A time-out defining device can include any suitable device which creates a time-out area 30. A time-out area 30 is a specifically defined area in which the child must remain for a limited period of time in response to a misbehavior. Examples of time-out defining devices which may be included in the kit 10 are a leash 24, a collapsible fence 26, and an identifying placard 28 having a phrase such as "do not disturb" or "time-out" printed thereon to indicate that the child must not be disturbed. The collapsible fence 26 can be any collapsible structure, which when assembled, defines a safe enclosure in which to contain a child, as shown in FIG. 2. A time-out area 30 may also be defined by the area which is accessible to a child once the leash 24 is strapped on to the child. For older children, those who are over three years of age for example, the placard 28 may be used to designate any desired area as a time-out area 30, and the child may be directed to go to the designated area on his or her own. The placard 28 not only identifies the time-out area 30 to the child, but also, alerts others that the child should not be disturbed. Thus, the time-out area 30 can be defined by the area around which the collapsible fence 26 is erected, any location in a room which is identified by the identifying placard 28, or any other containment area. However, it is preferred that the time-out area 30 not be an area in which the child typically engages in play or recreational activities, such as a bedroom or a playpen, so that the child is not confused as to the purpose of the containment.

Examples of craft tools 19 which may be contained in the kit 10 include markers, glue, magnets, paper, scissors, and blank stickers. The caregiver will utilize the craft 19 tools to create symbols to represent values and goals which the caregiver deems are valuable to the family and affix these symbols to various objects in the house as helpful reminders to the caregiver, the child, and others in the family.

Each stop sign 18 is placed in locations frequented most by both the caregiver and the child. The stop sign 18 will remind children and caregivers alike to stop and think before acting upon a certain impulse.

The caregiver's training devices 20 are to be used by the caregiver for instruction on behavior shaping. Typical examples of caregiver's training devices include, but are not limited to, educational materials, informational materials, video tapes, and a guideline for outlining the family's agreed upon expectations. Also included as part of the caregiver's training devices is a telephone number 38 for the caregiver to call to seek advice from a professional experienced in the area of behavioral science.

In one embodiment of the invention, the caregiver utilizes warning stickers 32 as communication facilitators. The caregiver affixes the warning stickers 32 to items in the house which the caregiver deems are not suitable for the child to contact. The warning stickers 32 have the word "NO" or other prohibitive indicia printed thereon. The warning stickers 32 may also be color coded to indicate which items must not be contacted.

When a child comes into contact with items having warning stickers 32 or engages in any other misbehavior, a caregiver must immediately restrict the child's movement area. The caregiver may place the child in a time-out area 30, or if the child is not at home, the child's movement may be restricted with a leash 24. For example, if the child is one to three years of age, the caregiver may place the child within the confines of the fence as depicted in FIG. 2. It is recommended that a child spend one minute in the time-out area 30 for each year of age. After using the kit 10 for about two months, it may be appropriate with some children to increase the time spent in a time-out area 30 by one minute for repetitive misbehavior. Preferably, a child who is one to three years of age should not be confined in excess of five minutes. An automatic timing device 34, an egg timer 36, or both may be employed to measure the duration the child spends in a time-out area 30. However, an egg timer 36 is ideal for allowing younger children to monitor how much time has elapsed.

In another form of the invention, designed for children who are three years old and above, the communication facilitator may comprise a contractual instrument 40 to supplement or replace the warning stickers 32. The contractual instrument 40 defines goals and values agreed upon by the child and the caregiver, rewards for achieving goals, as well as misbehavior and consequences for misbehavior. The caregiver and the child may utilize the craft tools 19 to create symbols to represent the goals and activities defined in the contractual instrument 40, and affix these symbols to various objects in the house as helpful reminders. When a child misbehaves and/or fails to achieve the stated goals, the child may be placed in a time-out area 30, elect to suffer one of the alternative consequences agreed upon in the contract, or both. An alternative consequence could be, for example, denial of at least one of the child's privileges.

It is to be understood that the present invention is not limited to the embodiments described above, but encompasses any and all embodiments within the scope of the following claims.

I claim:

1. A method for shaping behavior of a child, comprising the steps of:

affixing prohibitory indicia to two or more items in a house to designate items the child should stay away from;

providing a time-out area, said time-out area not being an area in which the child can engage in play or recreational activities; and displaying stop signs at various locations in the house for reminding child and caregiver to stop and think before acting.

2. The method of claim 1 further comprising the step of confining the child in said time-out area for a predetermined duration in response to the child's failure to comply with the prohibitory indicia.

3. The method of claim 2, wherein the child is confined by a child's leash or tether, said time-out area being the area accessible to the child once confined by said leash or tether.

4. The method of claim 1, wherein said time-out area is defined by a collapsible fence, the area inside the perimeter of said fence comprising said time-out area.

5. The method of claim 1, wherein said time-out area is any area identified by an identifying placard.

6. The method of claim 1, wherein the child is confined in a time-out area for a duration of one minute for each year of the child's age.

7. The method of claim 6, wherein said duration is measured by a timer.

8. The method of claim 7, wherein said timer is an automatic timer or an egg timer.

9. The method of claim 1, further wherein the caregiver utilizes craft tools to prepare graphics which symbolize goals and values desirable to the caregiver.

10. The method of claim 1, further comprising the steps of:

devising a tangible contractual instrument which defines goals, values, rewards for exceeding expectations, misbehavior, and consequences for misbehavior as agreed upon by both a caregiver and the child;

preparing graphics to symbolize values and goals defined in said contractual instrument; and displaying said graphics at various locations in the house.

11. The method of claim 1, wherein the prohibitory indicia comprises stickers.

12. The method of claim 1, wherein the prohibitory indicia are placed on items outside the time-out area.

13. The method of claim 1, wherein the prohibitory indicia are placed on items that do not define the time-out area.

* * * * *